United States Patent
Burd et al.

(10) Patent No.: US 11,699,030 B1
(45) Date of Patent: *Jul. 11, 2023

(54) SYSTEMS AND METHODS FOR A KNOWLEDGE-BASED FORM CREATION PLATFORM

(71) Applicant: Google LLC, Mountain View, CA (US)

(72) Inventors: Emily Burd, New York, NY (US); James Michael McCollum, Brooklyn, NY (US); Benjamin Schrom, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,493

(22) Filed: Jul. 8, 2022

Related U.S. Application Data

(63) Continuation of application No. 16/680,352, filed on Nov. 11, 2019, now Pat. No. 11,386,262, which is a
(Continued)

(51) Int. Cl.
*G06F 17/00* (2019.01)
*G06F 40/174* (2020.01)
(Continued)

(52) U.S. Cl.
CPC .......... *G06F 40/174* (2020.01); *G06F 3/0481* (2013.01); *G06F 3/0484* (2013.01);
(Continued)

(58) Field of Classification Search
CPC .... G06F 40/174; G06F 3/0481; G06F 3/0484; G06F 16/24573; G06F 16/24575; G06F 16/248; G06N 5/02; G06T 11/206
See application file for complete search history.

(56) References Cited

U.S. PATENT DOCUMENTS

| | | |
|---|---|---|
| 2001/0032244 A1 | 10/2001 | Neustel |
| 2005/0283474 A1 | 12/2005 | Francis |

(Continued)

OTHER PUBLICATIONS

Kim, Michelle Y. "QA Builder: a visual toolkit for building multimedia knowledge-based systems with immediate feedback." Proceedings of the Third IEEE International Conference on Multimedia Computing and Systems. IEEE, 1996 (Year: 1996).*
(Continued)

*Primary Examiner* — Andrew T McIntosh
(74) *Attorney, Agent, or Firm* — Lowenstein Sandler LLP

(57) ABSTRACT

A detection is made that a user of a platform has provided first question text associated with a question via a user interface (UI). A first answer field format including a first data type associated with one or more first key terms of the question text is identified. The UI is updated to include first answer field options related to the first question text based on at least the first data type of the identified answer field format. In response to a detection that the user has provided second question text associated with the question via the UI, a second answer field format including a second data type associated with second key terms and at least one of the first key terms is identified. The UI is updated to include second answer field options related to the first question text and the second question text.

20 Claims, 5 Drawing Sheets

Related U.S. Application Data continuation of application No. 15/139,575, filed on Apr. 27, 2016, now Pat. No. 10,474,745.

(51) Int. Cl.
| | |
|---|---|
| *G06T 11/20* | (2006.01) |
| *G06F 3/0481* | (2022.01) |
| *G06F 3/0484* | (2022.01) |
| *G06N 5/02* | (2023.01) |
| *G06F 16/248* | (2019.01) |
| *G06F 16/2457* | (2019.01) |

(52) U.S. Cl.
CPC ...... *G06F 16/248* (2019.01); *G06F 16/24573* (2019.01); *G06F 16/24575* (2019.01); *G06N 5/02* (2013.01); *G06T 11/206* (2013.01)

(56) References Cited

U.S. PATENT DOCUMENTS

| | | |
|---|---|---|
| 2008/0294637 A1 | 11/2008 | Liu |
| 2009/0100371 A1 | 4/2009 | Hu |
| 2016/0006775 A1 | 1/2016 | Baldwin et al. |

OTHER PUBLICATIONS

Moldovan, Dan, et al. "Cogex: A logic prover for question answering." Proceedings of the 2003 Human Language Technology Conference of the North American Chapter of the Association for Computational Linguistics. 2003 (Year: 2003).*

Srihar et al., A Question Answering System Supported by Information Extraction, AFRL, 2000, pp. 166-172 (Year: 2000).

Wenyin etal., A Web-Based Platform for User-Interactive Question-Answering, Springer, 2008, pp. 107-124 (Year: 2008).

* cited by examiner

SYSTEMS AND METHODS FOR A KNOWLEDGE-BASED FORM CREATION PLATFORM

CROSS REFERENCE TO RELATED APPLICATION

This application is a continuation of U.S. patent application Ser. No. 16/680,352, filed Nov. 11, 2019, and entitled "Systems and Methods for A Knowledge-based Form Creation Platform", which is a continuation of U.S. patent application Ser. No. 15/139,575, filed on Apr. 27, 2016, now U.S. Pat. No. 10,474,745, issued Nov. 12, 2019, and entitled "Systems and Methods for A Knowledge-based Form Creation Platform," the entire contents of which are incorporated herein by reference.

FIELD OF THE INVENTION

In general, this disclosure relates to electronic form creation, in particular, to systems and methods for knowledge-based form creation.

BACKGROUND

Electronic forms such as a questionnaire, interactive quiz, or survey forms are widely used for a variety of purposes, such as user feedback collection, registration and enrollment, and/or computer-based examinations. To create an electronic form, a form creator such as an Internet user, can use a form creator software application to design questions in the form. The form creator usually needs to manually type in a question, and then manually specify a type of the question in order to design a corresponding answer field of a certain format for the respective question.

Thus, using existing form creation software, the form creator needs to repetitively set up the answer field for each question, which largely slows down the process of creating a form.

SUMMARY

Systems and methods disclosed herein provide a knowledge-based form creation platform. A form creation component may be initiated at a computing device to present a form creation user interface to a user. Content of a question can be received via a user interface from a user, from which a key term may be obtained. Information relating to the key term may be retrieved from a knowledge database, and the information may indicate an answer field format associated with the question. An answer field for the question may be automatically generated based on the answer fieldformat.

In some implementations, the form creation component is a browser-based application.

In some implementations, the form creation component may determine a type of the question based on the key term, and retrieve an answer field format associated with the type of the question.

In some implementations, the answer field format includes any of a text field, a checkbox, or a drop-down option menu.

In some implementations, the knowledge database includes any of a local database or a remote cloud-based database.

In some implementations, the information includes a plurality of answer options related to the question.

In some implementations, the information includes a suggested answer related to the question.

In some implementations, the knowledge database stores a knowledge graph.

In some implementations, the answer field is generated at least in part based on an association with another previously created answer field.

In some implementations, the form creation component may receive an indication of user approval or disapproval in response to the automatically generated answer field, generate heuristics data indicative of the user's preference based on the user approval or disapproval decision, and optionally revise the automatically generated answer field based on the heuristics data.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
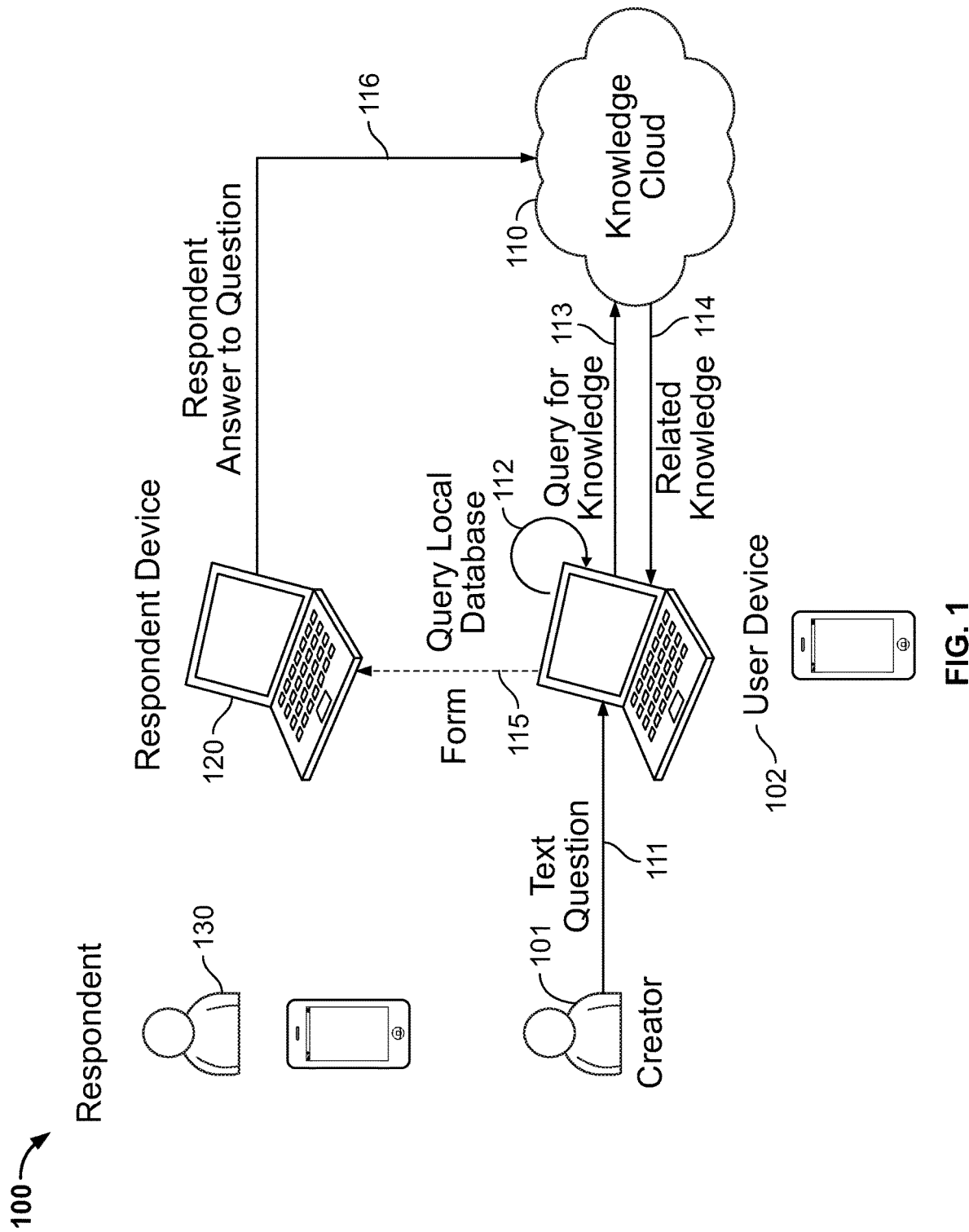
FIG. 1 is an example block diagram of a computerized system 100 illustrating data flow interaction between various entities for a knowledge-based form creation platform.

To provide an overall understanding of the systems and methods described herein, certain embodiments will now be described, including a system and method for managing suggested edits in an editing environment. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Systems and methods described herein may be used to enhance form creation over existing systems. Existing tools require a user to enter a form question and define an answer and answer type. For example, when the form creator wants to design a question to obtain the respondent's email address, the form creator may type in the questions that the respondent will see "what is your email address?" Using existing form creation tools, the form creator usually manually specifies the type of the question, i.e., a short text question, and selects a blank text field as the answer field for the question. In another example, when the form creator wants to design a question such as "What day is best for you?", in addition to typing in the question, the form creator can specify the question type as a question of multiple choice of seven. The form creator can then specify the seven options to the question, i.e., Sunday to Saturday.

The systems and methods described herein provide an automatic form creation component that uses data analytics from a knowledge database. The automatic form creation may reduce manual steps needed from a form creator (e.g., the user) and provide a more efficient user experience for form creation.

For instance, in the respective example of the user specified form question "what is your email address?," the form creation component may identify a key term such as "email address," and may then automatically determine an answer field related to the key term, e.g., a text field. In addition, the form creation component can add a validation sign "@" for the answer field such that the respondent can see an answer field in a format like "_@_____" In the other example of the question "What day is best for you?", the form creation component may identify the key term "day" and "best," based on which the form creation component may automatically choose a multiple choice answer and populate a list of seven options Monday to Sunday for the respondent to select from. In this way, the form creation component may analyze and extract key terms from the question, and may then create an answer field with options or suggested answers based on analytics from a knowledge database.

FIG. 1 is an example block diagram of a computerized system 100 illustrating data flow interaction between various entities for a knowledge-based form creation platform. A form creator (e.g., a user of the system) 101, the user device(s) 102 of the form creator, a remote knowledge cloud server 110, a respondent device 120, a respondent of the created form 130, and/or other entities may interact with a communication network. The communication network may include any of a cellular network, a cable network, wireless local area network (LAN), near-field connections, Bluetooth network, and/or the like. The user device 102 or respondent device 120 may each include a variety of devices such as a desktop computer, a laptop computer, a personal digital assistant (PDA), a tablet computer, a Smartphone, a smart wearable device, and/or the like.

A form creator 101 may submit a question by typing the text for the question 111 to the user device 102, which may in turn query (e.g., 112) a local database for locally stored knowledge relating to the question. The knowledge may include a knowledge graph with information relating to the user such as the user's profile information, interests, and/or the like, personal knowledge based on the user's web history, email, calendar events, location, location contacts and/or the like. The knowledge may further include association between previously created questions, previous approval or disapproval from the user relating to a similar question creation, and/or the like. The knowledge may also comprise information relating to user reviews, ratings to products or events, public event calendars, historical information of user web activities, social media activities, and/or the like of a large set of Internet users, or from a public remote storage server(s). The knowledge may be used to generate a format relating to the question, answer options or a suggested answer to the question and/or the like. The user of knowledge to generate answer fields is further discussed in FIG. 2A-B.

The user device 102 may also optionally send a query 113 for knowledge to a remote knowledge cloud server 110, which may in turn return related personal knowledge 114 to the user device. Related knowledge 114 may include but is not limited to browsing history, social media posting history, data analytics from various data sources, and/or the like.

The created form 115 from the user device 102 may be directly or indirectly provided to a respondent 130 via the respondent device 120. The respondent answer to the question 116 may be optionally stored at the knowledge cloud 110, which may be used to generate heuristics data for creation. For example, the respondent's answer to a question may be used to generate suggested answers to a similar question.

Figure 2A:
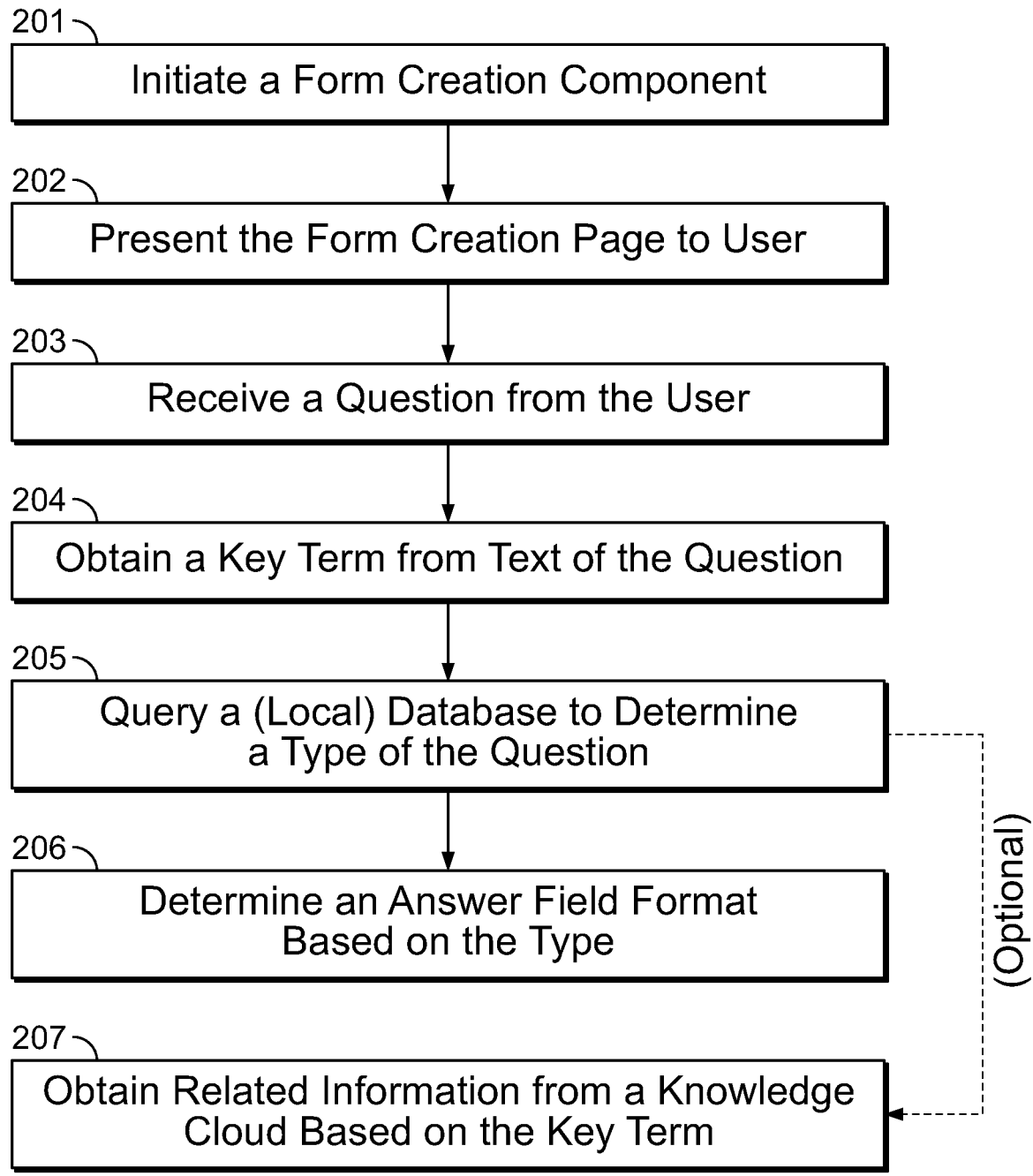
FIGS. 2A-2B provide an example logic flow diagrams illustrating example work flows for automatic form creation based on knowledge data.
Figure 2B:
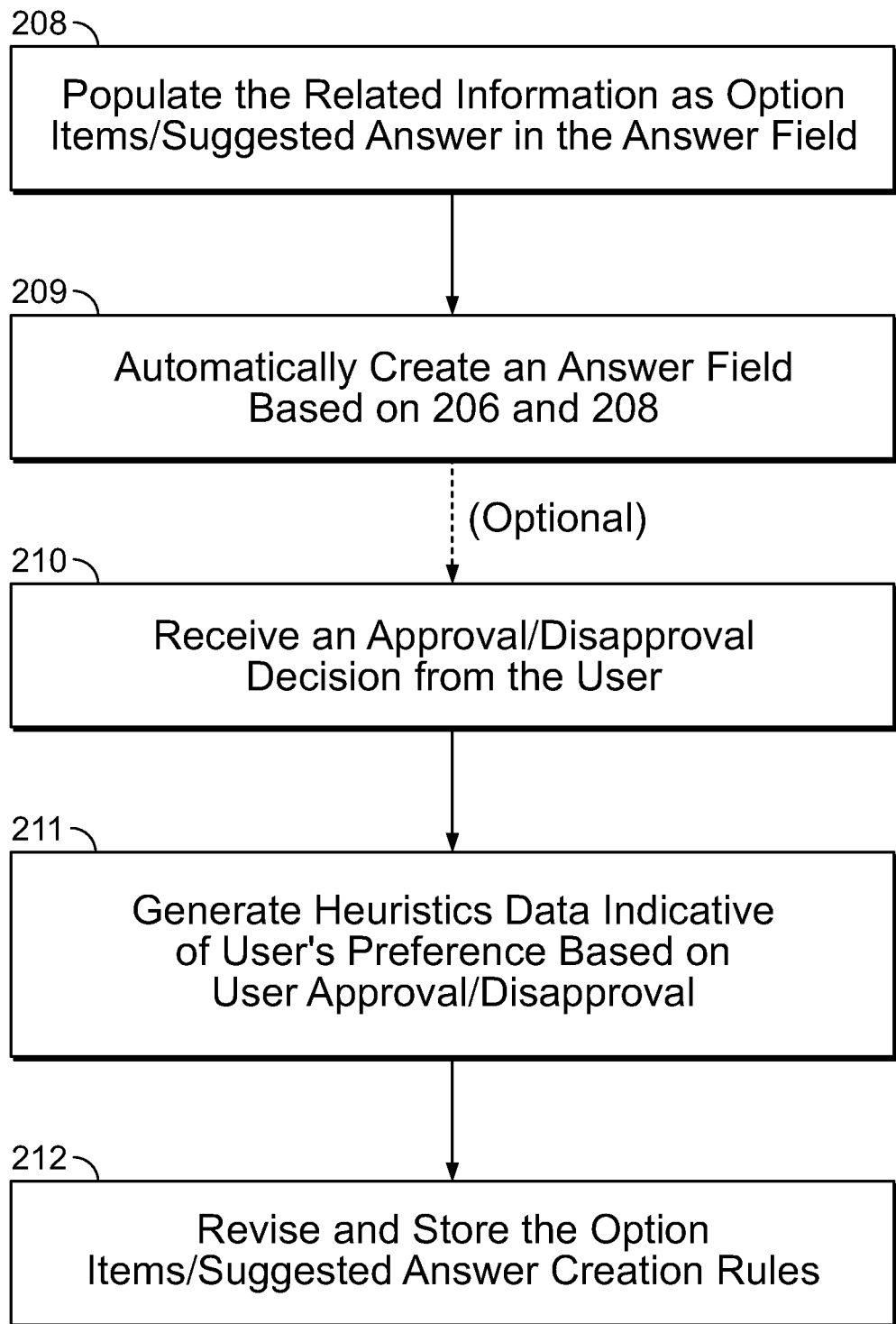

FIG. 2A-2B provide example logic flow diagrams illustrating example work flows for automatic form creation based on knowledge data. Starting at 201, the form creator may initiate a form creation component, e.g., a browser-based application, or a mobile application at a computing device such as a desktop computer, a workstation, a mobile device, and/or the like. A form creation page may be presented to a user (e.g., the form creator) at 202, and then a question may be entered into the form creation component by the user typing in the question text at 203. The form creation component may analyze the question text to obtain a key term from the text of the question 204. For example, a key term such as "name," "email address," "favorite," etc., may be used by the form creation component to determine an answer field format at 206. The form creation component may determine a type of the question e.g., by querying a database at 205. For example, when the question contains the key term "name," a relevant answer field format may be a plain text field. Or when the question contains the key term "date of birth," a relevant answer field may include a formatted field such as "_/_/_ (mm/dd/yy)" or other date related format. Or alternatively, when the question contains the key term "date of birth," the question type may be related to an answer field that includes a drop-down list such that the respondent can select the month, date and year.

At 207, the form creation application may also obtain further information from a knowledge cloud based on the key term, and then populate the related information as option items or suggested answers in the answer field at 208. For example, when the question contains key terms such as "favorite," "movie," the form creation application may obtain a list of movie names from a knowledge graph in the cloud and display the movie names as multiple choice options. For another example, when the question contains key terms such as "favorite," "election," the form creator's location may be used to query in cloud what election is associated with the location at the time, and a list of candidates can be generated as multiple choice options. In another example, as shown in FIG. 1, the respondent's answer to the question (e.g., 116) may be sent to the knowledge cloud and may be used for multiple choice options. For example, for a question "when was the Bastille prison in Paris occupied?", incorrect answers (e.g., 1890, 1832, 1833, etc.) that are previously submitted by various respondents can be used as multiple choice options.

At 209, an answer field (with multiple choice options or suggested answers in a text field, etc.) may be automatically created, without manually specifying an answer field format or manually typing in multiple choice option or suggested answers. However, if the form creator would like to manually change the automatically generated answer field, the form creator can approve or disapprove the automatically generated field. Such approval or disapproval decision message may be received by the form creation application at 210, which may generate heuristics data indicative of a user's preference in form creation at 211. The heuristics data may be stored locally or in a remote knowledge cloud to revise the answer field creation rules at 212.

The user approval or disapproval of automatically created form question and answer fields discussed in connection with steps 209-212 in FIG. 2B can be illustrated in the UI diagram in FIG. 3. For example, when the question contains key terms such as "date of birth," (e.g., see 301), an automatic answer including a drop-down list 302 to allow a respondent to select the month, date and year can be created. The form creator can select an "edit" button 303 to disapprove and change the automatically created answer field. If, the form creator manually selects an answer field at 305 that includes a formatted text field such as "_/_/_ (mm/dd/yyyy)" 306, the form creation application may generate a heuristics rule based on the user's preference to use such a formatted text field for questions relating to a date. Then, for the same form, or for a subsequent form, when the form creator submits another question such as "when is your start date at the current employer?" the form creation application may automatically create a formatted text field as the form creator previously selected, such as "_/_/_ (mm/dd/yyyy)," instead of a drop-down list.

Figure 3:
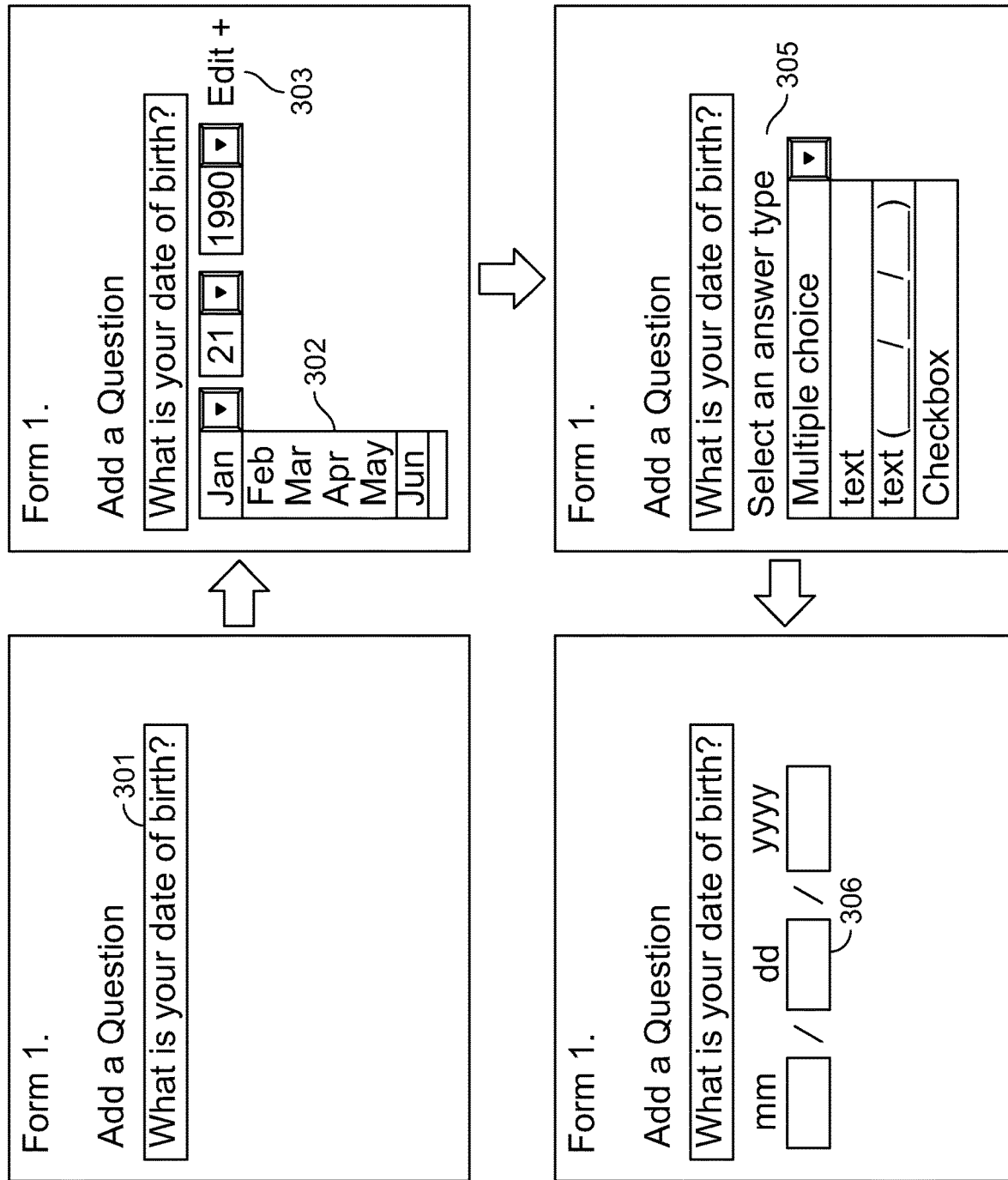
FIG. 3 provides a user interface (UI) diagram illustrating example UIs of the knowledge-based form creation as described in FIGS. 2A-2B.
Figure 4:
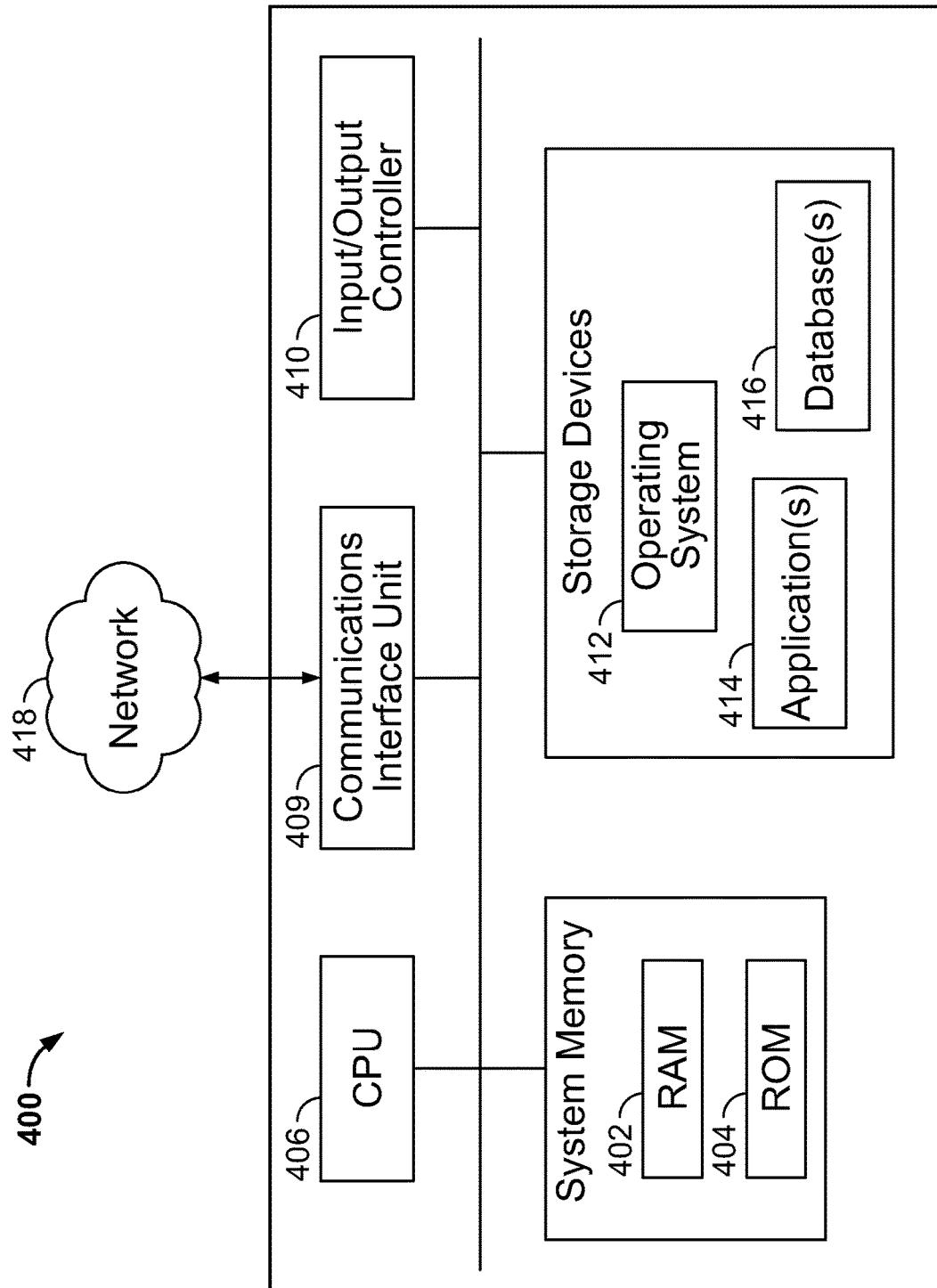
FIG. 4 is a block diagram illustrating an exemplary computer system 400 with which the system for a knowledge-based form creation and use of FIGS. 1-3 can be implemented.

FIG. 4 is a block diagram illustrating an exemplary computer system 400 with which the system for a knowledge-based form creation and use of FIGS. 1-3 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including m flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the service, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PRP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via an input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the system for knowledge-based form creation as shown in FIGS. 1-3, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the processes described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, an enterprise server or group of servers, one or more desktop computers, one or more laptop computers, etc. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   detecting, by a processing device, that a user of a platform has provided first question text associated with a question via a user interface (UI) of a client device associated with the user;
   identifying a first answer field format comprising a first data type associated with one or more first key terms of the first question text;
   updating the UI to include one or more first answer field options related to the first question text, wherein the one or more first answer options are presented based on at least the first data type of the identified answer field format;
   responsive to detecting that the user has provided second question text associated with the question via the UI, identifying a second answer field format comprising a second data type associated with one or more second key terms of the first question text and at least one of the one or more first key terms of the first question text; and
   updating the UI to include one or more second answer field options related to the first question text and the second question text, wherein the one or more second answer options are presented based on at least the second data type of the second answer field format.

2. The method of claim 1, wherein the first answer field format and the second answer field format are identified from a knowledge database.

3. The method of claim 2, wherein identifying the first answer field format comprises:
   requesting, from the knowledge database, first data associated with the one or more first key terms of the first question text, wherein the first data comprises one or more answer field formats associated with the one or more first key terms;
   determining a first type of the question based on the one or more first key terms; and
   selecting, based on the second data, the first answer field format associated with the type of the question.

4. The method of claim 3, wherein identifying the second answer field format comprises:
   requesting, from the knowledge database, second data associated with the one or more second key terms of the second question text, wherein the second data comprises one or more answer field formats associated with the one or more second key terms;
   determining a second type of the question based on the one or more second key terms and the at least one of the one or more first key terms; and
   selecting, based on the first data and the second data, the second answer field format associated with the second type of the question.

5. The method of claim 1, further comprising:
   determining one or more potential answers associated with the question in view of the one or more second key terms and the at least one of the one or more first key terms; and
   updating the UI to include the determined one or more potential answers as suggested answers to the question.

6. The method of claim 1, further comprising:
   receiving a request to change the second answer field format to a supplemental answer field format, wherein the request comprises one or more supplemental data types of the supplemental answer field format; and updating the UI to include one or more third answer field options based on at least the supplemental data type of the supplemental answer field format.

7. The method of claim 6, further comprising:
generating heuristics data indicating the requested change to the second answer field format to the supplemental answer field format, wherein the heuristics data is subsequently used to determined whether to recommend the second answer field format in response to receiving subsequent key terms of a subsequent question from a second user.

8. The method of claim 1, wherein at least one of the first answer field format or the second answer field format comprises at least one of: a text field, a check box, or a drop-down option menu.

9. A system comprising:
a memory; and
a processing device coupled to memory, the processing device to perform operations comprising:
detecting, by a processing device, that a user of a platform has provided first question text associated with a question via a user interface (UI) of a client device associated with the user;
identifying a first answer field format comprising a first data type associated with one or more first key terms of the first question text;
updating the UI to include one or more first answer field options related to the first question text, wherein the one or more first answer options are presented based on at least the first data type of the identified answer field format;
responsive to detecting that the user has provided second question text associated with the question via the UI, identifying a second answer field format comprising a second data type associated with one or more second key terms of the first question text and at least one of the one or more first key terms of the first question text; and
updating the UI to include one or more second answer field options related to the first question text and the second question text, wherein the one or more second answer options are presented based on at least the second data type of the second answer field format.

10. The system of claim 9, wherein the first answer field format and the second answer field format are identified from a knowledge database.

11. The system of claim 10, wherein identifying the first answer field format comprises:
requesting, from the knowledge database, first data associated with the one or more first key terms of the first question text, wherein the first data comprises one or more answer field formats associated with the one or more first key terms;
determining a first type of the question based on the one or more first key terms; and
selecting, based on the second data, the first answer field format associated with the type of the question.

12. The system of claim 11, wherein identifying the second answer field format comprises:
requesting, from the knowledge database, second data associated with the one or more second key terms of the second question text, wherein the second data comprises one or more answer field formats associated with the one or more second key terms;
determining a second type of the question based on the one or more second key terms and the at least one of the one or more first key terms; and
selecting, based on the first data and the second data, the second answer field format associated with the second type of the question.

13. The system of claim 9, wherein the operations further comprise:
determining one or more potential answers associated with the question in view of the one or more second key terms and the at least one of the one or more first key terms; and
updating the UI to include the determined one or more potential answers as suggested answers to the question.

14. The system of claim 9, wherein the operations further comprise:
receiving a request to change the second answer field format to a supplemental answer field format, wherein the request comprises one or more supplemental data types of the supplemental answer field format; and
updating the UI to include one or more third answer field options based on at least the supplemental data type of the supplemental answer field format.

15. The system of claim 14, wherein the operations further comprise:
generating heuristics data indicating the requested change to the second answer field format to the supplemental answer field format, wherein the heuristics data is subsequently used to determined whether to recommend the second answer field format in response to receiving subsequent key terms of a subsequent question from a second user.

16. A non-transitory, computer-readable storage medium comprising instructions for a server that, when executed by a processing device, cause the processing device to perform operations comprising:
detecting, by a processing device, that a user of a platform has provided first question text associated with a question via a user interface (UI) of a client device associated with the user;
identifying a first answer field format comprising a first data type associated with one or more first key terms of the first question text;
updating the UI to include one or more first answer field options related to the first question text, wherein the one or more first answer options are presented based on at least the first data type of the identified answer field format;
responsive to detecting that the user has provided second question text associated with the question via the UI, identifying a second answer field format comprising a second data type associated with one or more second key terms of the first question text and at least one of the one or more first key terms of the first question text; and
updating the UI to include one or more second answer field options related to the first question text and the second question text, wherein the one or more second answer options are presented based on at least the second data type of the second answer field format.

17. The non-transitory, computer-readable storage medium of claim 16, wherein the first answer field format and the second answer field format are identified from a knowledge database.

18. The non-transitory, computer-readable storage medium of claim 17, wherein identifying the first answer field format comprises:

requesting, from the knowledge database, first data associated with the one or more first key terms of the first question text, wherein the first data comprises one or more answer field formats associated with the one or more first key terms;

determining a first type of the question based on the one or more first key terms; and selecting, based on the second data, the first answer field format associated with the type of the question.

19. The non-transitory, computer-readable storage medium of claim 18, wherein identifying the second answer field format comprises:

requesting, from the knowledge database, second data associated with the one or more second key terms of the second question text, wherein the second data comprises one or more answer field formats associated with the one or more second key terms;

determining a second type of the question based on the one or more second key terms and the at least one of the one or more first key terms; and selecting, based on the first data and the second data, the second answer field format associated with the second type of the question.

20. The non-transitory, computer-readable storage medium of claim 16, wherein the operations further comprise:

determining one or more potential answers associated with the question in view of the one or more second key terms and the at least one of the one or more first key terms; and updating the UI to include the determined one or more potential answers as suggested answers to the question.

* * * * *